US012686437B2

(12) United States Patent
Yoshikawa et al.

(10) Patent No.: US 12,686,437 B2
(45) Date of Patent: Jul. 21, 2026

(54) CRAWLER-TYPE WORK MACHINE

(71) Applicant: KOMATSU LTD., Tokyo (JP)

(72) Inventors: Takeshi Yoshikawa, Tokyo (JP); Hiroaki Takeshima, Tokyo (JP); Naoya Akiyama, Tokyo (JP); Toshikazu Okada, Tokyo (JP); Kazushi Nakata, Tokyo (JP); Osamu Yatsuda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 572 days.

(21) Appl. No.: 18/253,617

(22) PCT Filed: Nov. 5, 2021

(86) PCT No.: PCT/JP2021/040792
§ 371 (c)(1),
(2) Date: May 19, 2023

(87) PCT Pub. No.: WO2022/137833
PCT Pub. Date: Jun. 30, 2022

(65) Prior Publication Data
US 2024/0010273 A1    Jan. 11, 2024

(30) Foreign Application Priority Data
Dec. 25, 2020   (JP) ................................. 2020-216761

(51) Int. Cl.
B62D 11/08     (2006.01)
B62D 5/04      (2006.01)
(Continued)

(52) U.S. Cl.
CPC .............. B62D 11/08 (2013.01); B62D 5/046 (2013.01); B62D 5/0478 (2013.01); B62D 11/183 (2013.01); E02F 9/22 (2013.01)

(58) Field of Classification Search
CPC ...... B62D 11/08; B62D 5/046; B62D 5/0478; B62D 11/183; E02F 9/22
See application file for complete search history.

(56) References Cited

U.S. PATENT DOCUMENTS 3,144,107 A * 8/1964 Davies ..................... F16H 37/00
475/29
4,309,917 A * 1/1982 Leet ......................... B62D 11/18
477/68

(Continued)

FOREIGN PATENT DOCUMENTS

CN     101768991 A    7/2010
CN     104859714 A    8/2015
(Continued)

OTHER PUBLICATIONS

The International Search Report for the corresponding international application No. PCT/JP2021/040792, issued on Jan. 18, 2022.
(Continued)

*Primary Examiner* — Timothy Wilhelm
(74) *Attorney, Agent, or Firm* — Spencer Fane LLP

(57) ABSTRACT

A bulldozer causes left and right steering clutches to engage and left and right steering brakes to release when an operating amount of a steering lever is greater than a first predetermined amount and less than a second predetermined amount, and drives a turning motor so that the rotation speed of an inside output shaft becomes lower than the rotation speed of an outside output shaft as the operating amount of the steering lever increases. A controller causes the engagement rate of an inside steering clutch to decrease and causes an inside steering brake to brake when the operating amount of the steering lever is equal to or greater than the second predetermined amount.

18 Claims, 6 Drawing Sheets

(51) Int. Cl.
    *B62D 11/18* (2006.01)
    *E02F 9/22* (2006.01)

(56) References Cited

U.S. PATENT DOCUMENTS

| | | | | |
|---|---|---|---|---|
| 4,467,900 A * | 8/1984 | Shore | B62D 11/08 | 192/13 R |
| 5,285,861 A * | 2/1994 | Nakamura | B62D 11/183 | 180/6.7 |
| 5,473,541 A * | 12/1995 | Ishino | B62D 11/183 | 180/6.7 |
| 5,569,109 A * | 10/1996 | Okada | B62D 11/183 | 475/28 |
| 5,996,701 A * | 12/1999 | Fukasawa | E02F 9/2235 | 701/50 |
| 6,138,782 A * | 10/2000 | Anderson | B62D 11/183 | 180/6.7 |
| 6,260,642 B1 * | 7/2001 | Yamamoto | B62D 11/08 | 180/6.7 |
| 6,474,426 B2 * | 11/2002 | Yamamoto | B62D 11/183 | 180/6.7 |
| 6,654,676 B2 * | 11/2003 | Nakagawa | B62D 11/183 | 475/27 |
| 7,195,580 B2 * | 3/2007 | Funato | F16H 61/468 | 477/110 |
| 7,246,670 B2 * | 7/2007 | Hayashi | B62D 5/07 | 701/52 |
| 7,972,238 B2 * | 7/2011 | Hayashi | E02F 9/2253 | 475/23 |
| 8,869,921 B2 * | 10/2014 | Yoshikawa | B62D 11/08 | 180/6.7 |
| 9,079,613 B1 * | 7/2015 | Yoshikawa | B60W 10/02 | |
| 10,059,372 B2 * | 8/2018 | Sasada | B60W 10/06 | |
| 10,619,329 B2 * | 4/2020 | Yoshikawa | E02F 9/2253 | |
| 10,807,576 B2 * | 10/2020 | Crum | B60T 17/22 | |
| 11,161,546 B2 * | 11/2021 | Nakano | B62D 11/08 | |
| 11,536,006 B2 * | 12/2022 | Nakano | B62D 55/06 | |
| 12,276,079 B2 * | 4/2025 | Yoshikawa | E02F 9/2004 | |
| 12,351,234 B2 * | 7/2025 | Kikuchi | E02F 3/7604 | |
| 12,403,954 B2 * | 9/2025 | Akiyama | E02F 9/2079 | |
| 2002/0020579 A1 | 2/2002 | Yamamoto et al. | | |
| 2002/0193927 A1 * | 12/2002 | Nakagawa | B62D 11/183 | 701/41 |
| 2014/0196961 A1 * | 7/2014 | Yoshikawa | E02F 9/2025 | 180/6.62 |
| 2015/0217805 A1 * | 8/2015 | Yoshikawa | B62D 11/08 | 180/9.42 |
| 2018/0010320 A1 * | 1/2018 | Yoshikawa | B62D 11/003 | |
| 2018/0148026 A1 * | 5/2018 | York | B62D 11/10 | |
| 2024/0001988 A1 * | 1/2024 | Yoshikawa | B62D 11/005 | |
| 2024/0001989 A1 * | 1/2024 | Yoshikawa | E02F 9/225 | |
| 2024/0101192 A1 * | 3/2024 | Yoshikawa | B62D 11/04 | |

FOREIGN PATENT DOCUMENTS

| | | |
|---|---|---|
| CN | 108773409 A | 11/2018 |
| CN | 208682924 U | 4/2019 |
| JP | 53-27929 A | 3/1978 |
| JP | 10-138945 A | 5/1998 |
| JP | 2001-260928 A | 9/2001 |
| JP | 2002-362405 A | 12/2002 |
| JP | 2009-78775 A | 4/2009 |
| JP | 2010-144598 A | 7/2010 |

OTHER PUBLICATIONS

First Office Action received for Chinese Application No. 202180064783.8, issued on Jun. 20, 2025, 27 pages. (English Translation Submitted).

* cited by examiner

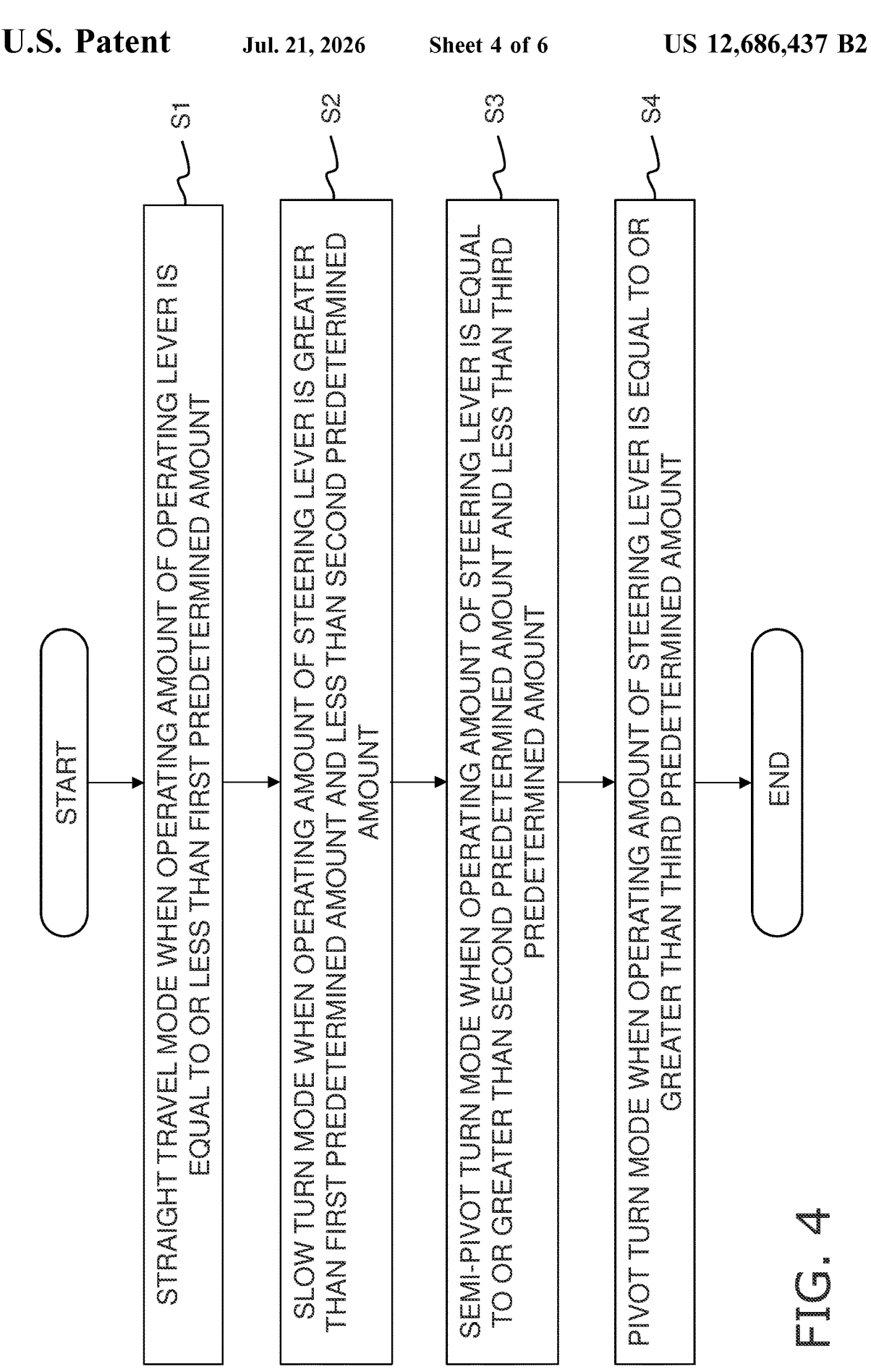

START

S1 — STRAIGHT TRAVEL MODE WHEN OPERATING AMOUNT OF OPERATING LEVER IS EQUAL TO OR LESS THAN FIRST PREDETERMINED AMOUNT

S2 — SLOW TURN MODE WHEN OPERATING AMOUNT OF STEERING LEVER IS GREATER THAN FIRST PREDETERMINED AMOUNT AND LESS THAN SECOND PREDETERMINED AMOUNT

S3 — SEMI-PIVOT TURN MODE WHEN OPERATING AMOUNT OF STEERING LEVER IS EQUAL TO OR GREATER THAN SECOND PREDETERMINED AMOUNT AND LESS THAN THIRD PREDETERMINED AMOUNT

S4 — PIVOT TURN MODE WHEN OPERATING AMOUNT OF STEERING LEVER IS EQUAL TO OR GREATER THAN THIRD PREDETERMINED AMOUNT

END

FIG. 4

CRAWLER-TYPE WORK MACHINE

CROSS-REFERENCE TO RELATED APPLICATIONS

This application is a U.S. National stage application of International Application No. PCT/JP2021/040792, filed on Nov. 5, 2021. This U.S. National stage application claims priority under 35 U.S.C. § 119(a) to Japanese Patent Application No. 2020-216761, filed in Japan on Dec. 25, 2020, the entire contents of which are hereby incorporated herein by reference.

TECHNICAL FIELD

The present disclosure relates to a crawler-type work machine.

BACKGROUND ART

A crawler-type work machine (e.g. a bulldozer, etc.) is conventionally known that comprises an input shaft that rotates by means of power from an engine, left and right steering clutches that transmit or block the rotational power from the input shaft to left and right output shafts, and left and right steering brakes that brake the left and right output shafts (see, for example, Japanese Patent Laid-open No. 2010-144598).

The crawler-type work machine described in Japanese Patent Laid-open No. 2010-144598 performs slow turning due to the steering clutch corresponding to the operating direction being released and the steering brake corresponding to the operating direction being made to perform to half-braking when a steering lever is operated in the left or right direction during traveling.

SUMMARY

However, in the crawler-type work machine described in Japanese Patent Laid-open No. 2010-144598, power loss of the engine is produced due to the slow turning being performed using the braking force of the steering brakes.

An object of the present disclosure is to provide a crawler-type work machine with which power loss of the engine during slow turning can be suppressed.

A crawler-type work machine according to an aspect of the present disclosure comprises left and right planetary gear mechanisms, left and right steering clutches, left and right steering brakes, a turning motor, a steering lever, and a controller. The left and right planetary gear mechanisms are disposed between an input shaft and left and right output shafts. The left and right steering clutches are configured to be able to rotate about the input shaft and switch between transmitting and blocking rotational power from the input shaft to the left and right output shafts by means of the left and right planetary gear mechanisms. The left and right steering brakes are configured to respectively brake the left and right output shafts. The turning motor is configured to cause the left and right steering clutches to rotate so that a rotation speed difference is produced between the left and right output shafts. The steering lever is configured to be operated in a left turning direction or a right turning direction using a neutral position as a point of reference. The controller is configured to control the left and right steering clutches, the left and right steering brakes, and the turning motor in response to the operating direction and the operating amount of the steering lever. When the operating amount is greater than a first predetermined amount and less than a second predetermined amount, the controller causes the left and right steering clutches to engage, causes the left and right steering brakes to release, and drives the turning motor so that, among the left and right output shafts, a rotation speed of an inside output shaft corresponding to the operating direction becomes lower than a rotation speed of an outside output shaft opposite to the operating direction as the operating amount increases. When the operating amount is equal to or greater than the second predetermined amount, the controller reduces the engagement rate of an inside steering clutch corresponding to the operating direction among the left and right steering clutches and causes an inside steering brake corresponding to the operating direction among the left and right steering brakes to brake.

According to the feature of the present disclosure, there can be provided a crawler-type work machine with which power loss of the engine during slow turning can be suppressed.

BRIEF DESCRIPTION OF DRAWINGS

FIG. 4 is a flow chart for explaining a turning control method according to the embodiment.

DESCRIPTION OF EMBODIMENTS (Configuration of Bulldozer 1)

Figure 1:
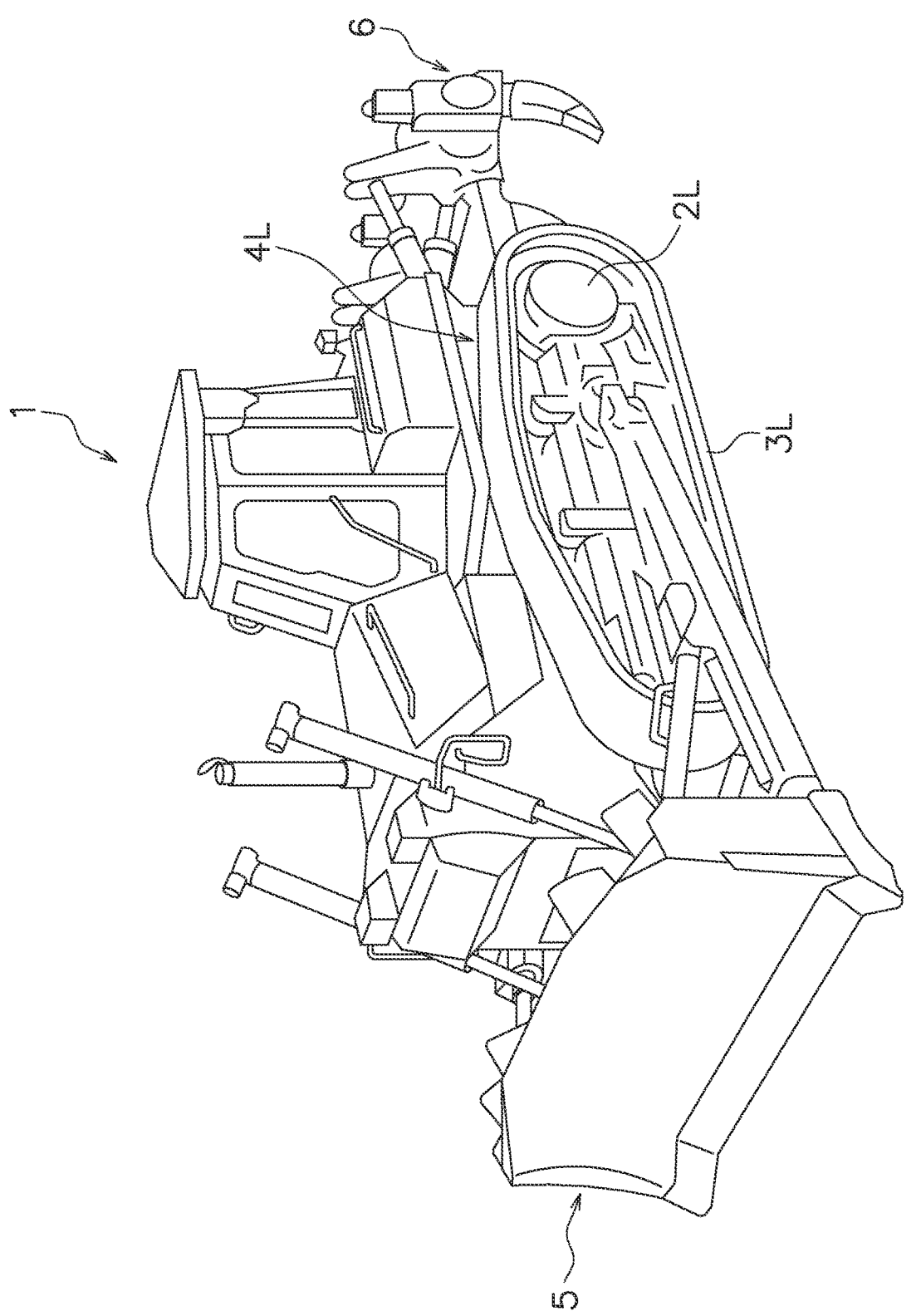
FIG. 1 is a perspective view of a bulldozer according to an embodiment.
Figure 2:
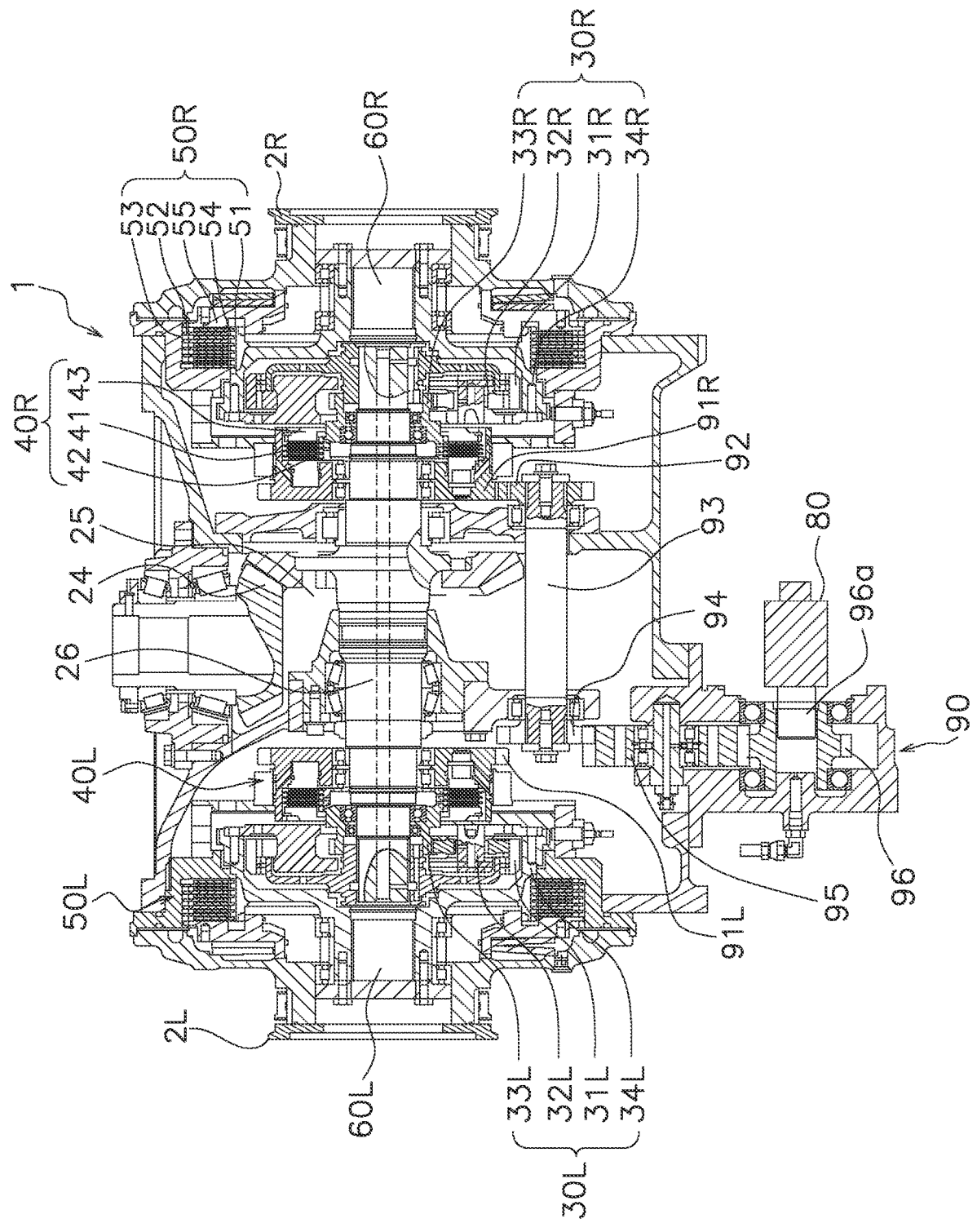
FIG. 2 is a cross-sectional configuration view of a power transmission system of the bulldozer according to the embodiment.
Figure 3:
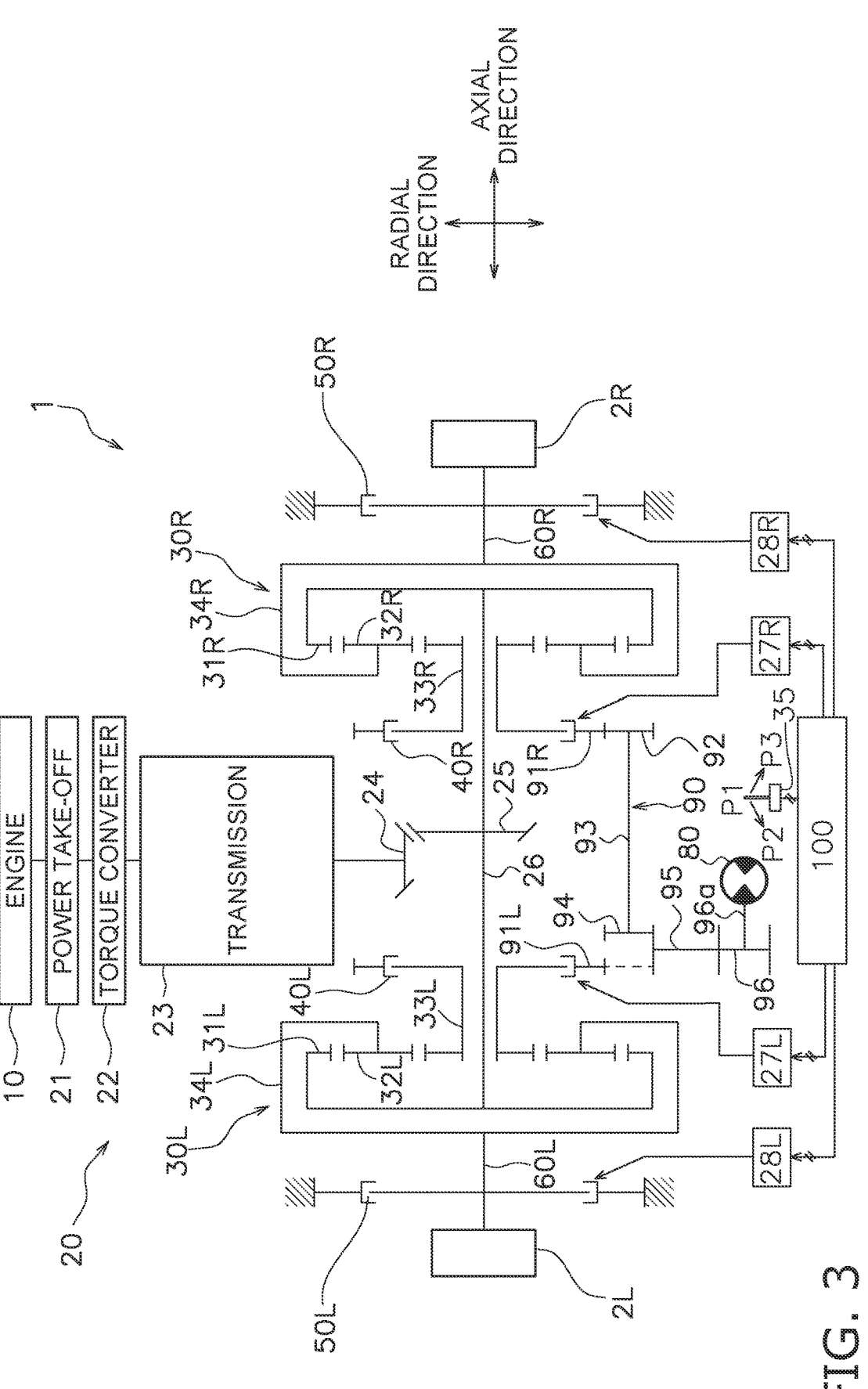
FIG. 3 is an outline system configuration view of the power transmission system of the bulldozer according to the embodiment.

FIG. 1 is a perspective view of a bulldozer 1 that is an example of the crawler-type work machine. FIG. 2 is a cross-sectional configuration view of the power transmission system of the bulldozer 1. FIG. 3 is an outline system configuration view of the power transmission system of the bulldozer 1.

As illustrated in FIG. 1, the bulldozer 1 is provided with left and right travel devices 4L, 4R that respectively have left and right sprockets 2L, 2R and left and right crawler belts 3L, 3R; a blade 5 provided to a vehicle front section; and a ripper device 6 provided to a vehicle rear section.

The bulldozer 1 is able to do work, such as pushing earth with the blade 5 and work such as crushing and excavating with the ripper device 6.

As illustrated in FIGS. 2 and 3, the bulldozer 1 includes the engine 10, an engine power transmitting section 20, left and right planetary gear mechanisms 30L, 30R, left and right steering clutches 40L, left and right steering brakes 50L, 50R, left and right output shafts 60R, a turning motor 80, a motor power transmitting section 90, and a controller 100.

[Engine Power Transmitting Section]

The engine power transmitting section 20 transmits power from the engine 10 to the left and right planetary gear mechanisms 30L, The engine power transmitting section 20 includes a power take-off device 21, a torque converter 22, a transmission 23, a pinion 24, a bevel gear 25, and an input shaft 26.

The power transmission device 21 transmits power from the engine 10 to the torque converter 22. The torque converter 22 transmits the power of the engine 10 transmitted by the power take-off device 21 to the transmission 23 by means of a fluid. The transmission 23 has a plurality of velocity stage clutches for changing the rotational power transmitted from the torque converter 22, and a direction stage clutch for switching between forward travel and reverse travel. The transmission 23 is coupled to the pinion 24. The power from the transmission 23 is transmitted through the pinion 24 and the bevel gear 25 to the input shaft 26. The input shaft 26 extends in the left-right direction. The axial direction of the input shaft 26 has the same meaning as the left-right direction of the bulldozer 1.

[Planetary Gear Mechanism]

The left and right planetary gear mechanisms 30L, 30R are disposed between the input shaft 26 and the left and right output shafts 60R. The left and right planetary gear mechanisms 30L, 30R respectively have left and right ring gears 31L, 31R, left and right planetary gears 32L, 32R, left and right sun gears 33L, 33R, and left and right carriers 34L, 34R.

The left and right ring gears 31L, 31R are coupled to the input shaft 26. The left and right planetary gears 32L, 32R are respectively disposed on the inside of the left and right ring gears 31L, 31R in a radial direction perpendicular to the axial direction of the input shaft 26. The left and right planetary gears 32L, 32R respectively mesh with the left and right ring gears 31L, 31R and the left and right sun gears 33L, 33R. The left and right sun gears 33L, 33R are rotatably attached to the input shaft 26. The left and right sun gears 33L, 33R are respectively disposed on the inside of the left and right planetary gears 32L, 32R in the radial direction. The left and right sun gears 33L, 33R are respectively coupled to the left and right steering clutches 40L, 40R. The left and right sun gears 33L, 33R be able to connect and disconnect with the motor power transmitting section 90 (specifically, below-mentioned left and right clutch gears 91L, 91R) through the left and right steering clutches 40L, 40R. The left and right carriers 34L, 34R are respectively coupled to the left and right planetary gears 32L, 32R and the left and right output shafts 60L, 60R.

[Steering Clutch]

The left and right steering clutches 40L, 40R are respectively disposed between the left and right planetary gear mechanisms 30L, 30R and the motor power transmitting section 90. The left and right steering clutches 40L, 40R respectively be able to connect and disconnect the left and right sun gears 33L, 33R of the left and right planetary gear mechanisms 30L, 30R with the left and right clutch gears 91L, 91R of the motor power transmitting section 90.

The left and right steering clutches 40L, 40R drive by supplying a hydraulic fluid. The left and right steering clutches 40L, 40R are configured by wet multiplate clutches that are able to be engaged and released. In the present embodiment, the left and right steering clutches 40L, 40R are positive-type hydraulic clutches. The left and right steering clutches 40L, 40R are released when hydraulic fluid is not supplied, are partially engaged when the pressure of the supplied hydraulic fluid is less than a predetermined value, and are completely engaged when the pressure of the supplied hydraulic fluid is equal to or greater than the predetermined value.

The pressure of the hydraulic fluid supplied to the left and right steering clutches 40L, 40R is controlled by the steering clutch control valves 27L, 27R. The engagement rate of the left and right steering clutches 40L, 40R change from 0% to 100% (maximum value) in response to the pressure of the supplied hydraulic fluid.

The left and right steering clutches 40L, 40R switch between transmitting and blocking the rotational power from the input shaft 26 to the respective left and right output shafts 60L, 60R by means of the respective left and right planetary gear mechanisms 30L, 30R.

Specifically, the rotation of the input shaft 26 is transmitted through the left ring gear 31L, the left planetary gear 32L, and the left carrier 34L to the left output shaft 60L when the left steering clutch 40L is engaged. Conversely, when the left steering clutch 40L is released, the left sun gear 33L enters a freely rotating state and the transmission of the rotational power from the input shaft 26 to the left output shaft 60L is blocked. Similarly, the transmission or blocking of the rotational power from the input shaft 26 to the right output shaft 60R is switched in response to the engagement or release of the right steering clutch 40R.

The left and right steering clutches 40L, 40R are able to rotate about the input shaft 26. The left and right steering clutches 40L, rotate in mutually opposite directions due to the rotational power from the turning motor 80 being transmitted through the motor power transmitting section 90.

For example, when the right steering clutch 40R rotates in reverse while the left steering clutch 40L rotates in the forward direction while the left and right steering clutches 40L, 40R are engaged, the rotation speed of the left output shaft 60L increases more than the rotation speed of the right output shaft 60R and the bulldozer 1 turns slowly to the right.

In the present description, a slow turn signifies that forward travel or reverse travel occurs such that an arc is drawn with a relatively large turning radius due to the rotation speed difference produced between the left and right output shafts 60L, 60R that rotate in the same direction.

In addition, when the left steering clutch 40L rotates in the forward direction while the left steering clutch 40L is engaged and the right steering clutch 40R is released, the rotation of the right output shaft is stopped and the left output shaft 60L rotates whereby the bulldozer 1 turns quickly to the right. However, when the bulldozer 1 turns quickly to the right, the right steering brake 50R brakes the right output shaft 60R as discussed below.

In the present description, a quick turn is a concept that includes pivot turning and semi-pivot turning. Pivot turning signifies turning about one of the crawler belts while the other crawler belt is completely stopped due to one of the left and right output shafts 60L, rotating while the other is completely stopped. Semi-pivot turning signifies turning while one of the crawler belts is substantially stopped due to one of the left and right output shafts 60L, 60R rotating while the other is allowed to rotate a little.

As illustrated in FIG. 2, the right steering clutch 40R has a plurality of clutch plates 41, a plurality of clutch disks 42, and a clutch piston 43.

The clutch plates 41 are attached to the right clutch gear 91R. The clutch disks 42 are fixed to the right sun gear 33R. The clutch plates 41 and the clutch disks 42 are disposed alternately in the axial direction.

When the clutch piston 43 moves in the left direction accompanying the supply of hydraulic fluid, the clutch plates 41 and the clutch disks 42 are pressed together and the right steering clutch 40R is engaged. Consequently, the right sun gear 33R of the right planetary gear mechanism 30R and the right clutch gear 91R of the motor power transmitting section 90 are joined together.

When the clutch piston 43 moves in the right direction accompanying the discharge of hydraulic fluid, the clutch plates 41 and the clutch disks 42 separate and the right steering clutch 40R is released. Consequently, the right sun gear 33R of the right planetary gear mechanism and the right clutch gear 91R of the motor power transmitting section move away from each other.

The left steering clutch 40L has the same configuration as the right steering clutch 40R.

[Steering Brake]

The left and right steering brakes 50L, 50R are driven by the supply of the hydraulic fluid. The left and right steering brakes 50L, are configured by wet multiplate clutches that are able to be engaged and released. In the present embodiment, the left and right steering brakes 50L, 50R are negative-type hydraulic brakes. The left and right steering brakes 50L, 50R are completely engaged when hydraulic fluid is not supplied, are partially engaged when the pressure of the supplied hydraulic fluid is less than a predetermined value, and are released when the pressure of the supplied hydraulic fluid is equal to or greater than the predetermined value. When the left and right steering brakes 50L, 50R are engaged (complete engagement or partial engagement), a braking force is produced on the left and right steering brakes 50L, 50R.

The pressure of the hydraulic fluid supplied to the left and right steering brakes 50L, 50R is controlled by left and right brake control valves 28L, 28R. When the left and right steering brakes 50L, 50R are engaged (complete engagement or partial engagement), a braking force is produced by the left and right steering brakes 50L, 50R. The braking force of the left and right steering brakes 50L, 50R changes from 0% to 100% (maximum value) in response to the pressure of the supplied hydraulic fluid.

The left and right steering brakes 50L, 50R respectively brake the rotation of the left and right output shafts 60L, 60R.

Specifically, when the left steering brake 50L is engaged, braking is applied to the rotation of the left output shaft 60L and the rotation of the left sprocket 2L is reduced. Conversely, when the right steering brake 50R is engaged, braking is applied to the rotation of the right output shaft 60R and the rotation of the right sprocket 2R is reduced.

As illustrated in FIG. 2, the right steering brake 50R has a rotating member 51, a brake housing 52, a plurality of fixing plates 53, a plurality of brake disks 54, and a brake piston 55.

The rotating member 51 is fixed to the right output shaft and rotates with the right output shaft 60R. The brake housing 52 is fixed to the rotating member 51. The fixing plates 53 are attached to the brake housing 52. The brake disks 54 are fixed to the rotating member 51. The fixing plates 53 and the brake disks 54 are disposed alternately in the axial direction.

When the brake piston 55 moves in the left direction accompanying the filling of the hydraulic fluid, the fixing plates 53 and the brake disks 54 separate and the right steering brake 50R is released. Conversely, when the brake piston 55 moves in the right direction accompanying the discharge of the hydraulic fluid, the fixing plates 53 and the brake disks 54 are pressed together and the braking force of the right steering brake 50R is produced.

The left steering brake 50L has the same configuration as the right steering brake 50R.

[Turning Motor]

The turning motor 80 is driven by power from the engine 10. The turning motor 80 rotates in the forward rotating direction or the reverse rotating direction. The rotating direction and the rotation speed of the turning motor 80 are controlled by the controller 100. The rotation speed of the turning motor 80 changes from 0% to 100% (maximum value) in response to the power transmitted from the engine 10.

The rotational power of the turning motor 80 is transmitted through the motor power transmitting section 90 to the left and right steering clutches 40L, 40R. The turning motor 80 causes the left and right steering clutches 40L, 40R to rotate so that a rotation speed difference is produced between the left and right output shafts 60L, 60R. For example, when the bulldozer 1 turns slowly to the right, the turning motor 80 causes the left and right steering clutches 40L, 40R to rotate in opposite directions and the rotation speed of the left output shaft 60L becomes higher than the rotation speed of the right output shaft 60R. When the bulldozer 1 is making a pivot turn to the right, although the turning motor causes the left and right steering clutches 40L, 40R to rotate in opposite directions, the right steering clutch 40R is released and the right steering brake 50R is braked whereby the right output shaft 60R does not rotate and only the left output shaft 60L rotates.

[Motor Power Transmitting Section]

The motor power transmitting section 90 is disposed between the turning motor 80 and the left and right steering clutches 40R. The motor power transmitting section 90 transmits the rotational power of the turning motor 80 to the left and right steering clutches 40L, 40R.

The motor power transmitting section 90 has the left and right clutch gears 91L, 91R, a first transfer gear 92, an auxiliary shaft 93, a second transfer gear 94, an idler gear 95, and a pinion gear 96.

The left and right clutch gears 91L, 91R be able to connect and disconnect with the left and right sun gears 33L, 33R by means of the left and right steering clutches 40L, 40R. The left and right clutch gears 91L, 91R are able to rotate about the axial direction of the input shaft 26. The left clutch gear 91L meshes with the idler gear 95. The right clutch gear 91R is coupled to the first transfer gear 92, the auxiliary shaft 93, and the second transfer gear 94 through the idler gear 95. The left and right clutch gears 91L, 91R rotate in opposite directions when the turning motor 80 rotates.

The idler gear 95 meshes with the left clutch gear 91L, the second transfer gear 94, and the pinion gear 96. The idler gear 95 is able to rotate about the axial direction of the input shaft 26.

The pinion gear 96 meshes with the idler gear 95. The pinion gear 96 is able to rotate about a pinion shaft 96a. The pinion gear 96 rotates due to the rotational power of the turning motor 80 that is transmitted through the pinion shaft 96a.

[Controller]

The controller 100 is connected to the steering lever 35 used for steering operations of the bulldozer 1. The steering lever 35 can be operated in a left turning direction P2 or a right turning direction P3 using a neutral position P1 as a point of reference. The operator is able to cause the bulldozer 1 to turn slowly or turn quickly (semi-pivot turn and pivot turn) to the left and right by adjusting the operating direction and the operating amount of the steering lever 35.

The controller 100 controls the rotation speed of the engine 10 and the velocity stage clutches and the direction stage clutches of the transmission 23 in order to cause the bulldozer 1 to travel.

The controller 100 controls the left and right steering clutches 40L, 40R, the left and right steering brakes 50L, 50R, and the turning motor 80 in response to the operating direction and the operating amount of the steering lever 35 in order to cause the bulldozer 1 to turn while the bulldozer 1 is traveling.

The controller 100 switches the travel mode of the bulldozer 1 between a "straight travel mode," a "slow turn mode," a "semi-pivot turn mode," and a "pivot turn mode" in response to the operating amount of the steering lever 35.

When the operating amount of the steering lever 35 is equal to or less than a first predetermined amount TH1, the controller 100 sets the travel mode of the bulldozer 1 to the straight travel mode. When the operating amount of the steering lever 35 is greater than the first predetermined amount TH1 and less than a second predetermined amount TH2, the controller 100 sets the travel mode of the bulldozer 1 to the slow turn mode. When the operating amount of the steering lever 35 is equal to or greater than the second predetermined amount TH2 and less than a third predetermined amount TH3, the controller 100 sets the travel mode of the bulldozer 1 to the semi-pivot turn mode. When the operating amount of the steering lever 35 is equal to or greater than the third predetermined amount TH3, the controller 100 sets the travel mode of the bulldozer 1 to the pivot turn mode.

The second predetermined amount TH2 is greater than the first predetermined amount TH1. The third predetermined amount TH3 is greater than the second predetermined amount TH2. The first to third predetermined amounts TH1 to TH3 can be set to desired values. The first predetermined amount TH1 may even be zero.

In the present description, the "semi-pivot turn mode" and the "pivot turn mode" may be collectively referred to as the "quick turn mode."

Straight Travel Mode

In the straight travel mode, the controller 100 controls the left and right clutch control valves 27L, 27R to cause the left and right steering clutches 40L, 40R to engage. The engagement rate of the left and right steering clutches 40L, 40R is set to 100%.

In the straight travel mode, the controller 100 controls the left and right brake control valves 28L, 28R to cause the left and right steering brakes 50L, 50R to release. The braking force of the left and right steering brakes 50L, 50R is set to 0%.

In the straight travel mode, the controller 100 stops the turning motor 80. The rotation speed of the turning motor 80 is set to 0%.

Slow Turn Mode

In the slow turn mode, the controller 100 controls the left and right clutch control valves 27L, 27R to cause the left and right steering clutches 40L, 40R to engage. While the respective engagement rates of the left and right steering clutches 40L, 40R are not limited in particular so long as the values are sufficiently high, it is preferable that the engagement rates are at least 90%, more preferable that the engagement rates are at least 95%, and especially preferable that the engagement rates are 100%.

In the slow turn mode, the controller 100 controls the left and right brake control valves 28L, 28R to cause the left and right steering brakes 50L, 50R to release. The braking force of the left and right steering brakes 50L, 50R is set to 0%.

In the slow turn mode, the controller 100 causes the turning motor 80 to be driven so that the rotation speed of an inside output shaft $60_{IN}$ becomes lower than the rotation speed of an outside output shaft $60_{OUT}$ as the operating amount of the steering lever 35 increases.

The inside output shaft $60_{IN}$ is the output shaft corresponding to the operating direction (that is, the turning direction) of the steering lever 35 among the left and right output shafts 60L, 60R. The outside output shaft $60_{OUT}$ is the output shaft opposite to the operating direction of the steering lever 35 among the left and right output shafts 60L, 60R.

The controller 100 increases the rotation speed of the turning motor 80 as the operating amount of the steering lever 35 increases. For example, the controller 100 may increase the rotation speed of the turning motor 80 gradually so as to be proportional to the operating amount of the steering lever 35, or may increase the rotation speed of the turning motor 80 in stages in response to the operating amount of the steering lever 35.

While the rotation speed of the turning motor 80 when the operating amount of the steering lever 35 is the second predetermined amount TH2 is not limited in particular so long as the value is sufficiently high, it is preferable that the rotation speed is at least 90%, more preferable that the rotation speed is at least 95%, and especially preferable that the rotation speed is 100% (maximum value).

Semi-Pivot Turn Mode

In the semi-pivot turn mode, the controller 100 controls the left and right clutch control valves 27L, 27R, causes the engagement rate of an inside steering clutch $40_{IN}$ to be lower than the engagement rate in the slow turn mode, and maintains the engagement rate of an outside steering clutch $40_{OUT}$ to be about the same as the engagement rate in the slow turn mode.

The inside steering clutch $40_{IN}$ is the steering clutch corresponding to the operating direction of the steering lever 35 among the left and right steering clutches 40L, 40R. The outside steering clutch $40_{OUT}$ is the steering clutch opposite to the operating direction of the steering lever 35 among the left and right steering clutches 40L, 40R.

While the target value of the engagement rate of the inside steering clutch $40_{IN}$ is not limited in particular so long as the value is sufficiently low, it is preferable that the target value is no more than 50%, more preferable that the target value is no more than 10%, and especially preferable that the target value is 0%. The controller 100 may gradually reduce the engagement rate of the inside steering clutch $40_{IN}$ to the target value so as to be inversely proportional to the operating amount of the steering lever 35, or may reduce the engagement rate of the inside steering clutch $40_{IN}$ in stages in response to the operating amount of the steering lever 35. Alternatively, the controller 100 may reduce the engagement rate of the inside steering clutch $40_{IN}$ to the target value when the operating amount of the steering lever 35 has reached the second predetermined amount TH2.

While the engagement rate of the outside steering clutch $40_{OUT}$ is not limited in particular so long as the value is sufficiently high, it is preferable that the engagement rate is at least 90%, more preferable that the engagement rate is at least 95%, and especially preferable that the engagement rate is 100%.

In the semi-pivot turn mode, the controller 100 controls the left and right brake control valves 28L, 28R to cause the inside steering brake $50_{IN}$ to brake and cause the outside steering brake $50_{OUT}$ to release.

The inside steering brake $50_{IN}$ is the steering brake corresponding to the operating direction of the steering lever 35 among the left and right steering brakes 50L, 50R. The outside steering brake $50_{OUT}$ is the steering brake opposite to the operating direction of the steering lever 35 among the left and right steering brakes 50L, 50R.

The controller 100 preferably increases the braking force of the inside steering brake $50_{IN}$ as the operating amount of the steering lever 35 increases. The controller 100 may increase the braking force of the inside steering brake $50_{IN}$ so as to be proportional to the operating amount of the steering lever 35, or may increase the braking force of the inside steering brake $50_{IN}$ in stages in response to the operating amount of the steering lever 35.

While the braking force of the inside steering brake $50_{IN}$ when the operating amount of the steering lever 35 is the third predetermined amount TH3 is not limited in particular so long as the value is sufficiently high, it is preferable that the braking force is at least 90%, more preferable that the braking force is at least 95%, and especially preferable that the braking force is 100%. The braking force of the outside steering brake $50_{OUT}$ is 0% in the same way as in the slow turn mode.

In the semi-pivot turn mode, the controller 100 maintains the rotation speed of the turning motor 80 at about the same rotation speed in the slow turn mode. While the rotation speed of the turning motor 80 is not limited in particular so long as the value is sufficiently high, it is preferable that the rotation speed is at least 90%, more preferable that the rotation speed is at least 95%, and especially preferable that the rotation speed is 100%.

Pivot Turn Mode

In the pivot turn mode, the controller 100 controls the left and right clutch control valves 27L, 27R and maintains the respective engagement rates of the inside steering clutch $40_{IN}$ and the outside steering clutch $40_{OUT}$ to be about the same as the engagement rates in the semi-pivot turn mode. The engagement rate of the inside steering clutch $40_{IN}$ is lower than the engagement rate in the slow turn mode.

While the target value of the engagement rate of the inside steering clutch $40_{IN}$ is not limited in particular so long as the value is sufficiently low, it is preferable that the target value is no more than 50%, more preferable that the target value is no more than 10%, and especially preferable that the target value is 0%. While the engagement rates of the outside steering clutch $40_{OUT}$ is not limited in particular so long as the value is sufficiently high, it is preferable that the engagement rate is at least 90%, more preferable that the engagement rate is at least 95%, and especially preferable that the engagement rate is 100%.

In the pivot turn mode, the controller 100 controls the left and right brake control valves 28L, 28R to cause the inside steering brake $50_{IN}$ to be completely engaged and cause the outside steering brake $50_{OUT}$ to release. The braking force of the inside steering brake $50_{IN}$ is 100% and the braking force of the outside steering brake $50_{OUT}$ is 0%.

In the pivot turn mode, the controller 100 maintains the rotation speed of the turning motor 80 at about the same rotation speed in the semi-pivot turn mode. While the rotation speed of the turning motor 80 is not limited in particular so long as the value is sufficiently high, it is preferable that the rotation speed is at least 90%, more preferable that the rotation speed is at least 95%, and especially preferable that the rotation speed is 100%.

(Turning Control Method)

Next, a turning control method performed by the controller 100 is explained assuming that the operating amount of the steering lever is gradually increasing from zero.

Figure 5:
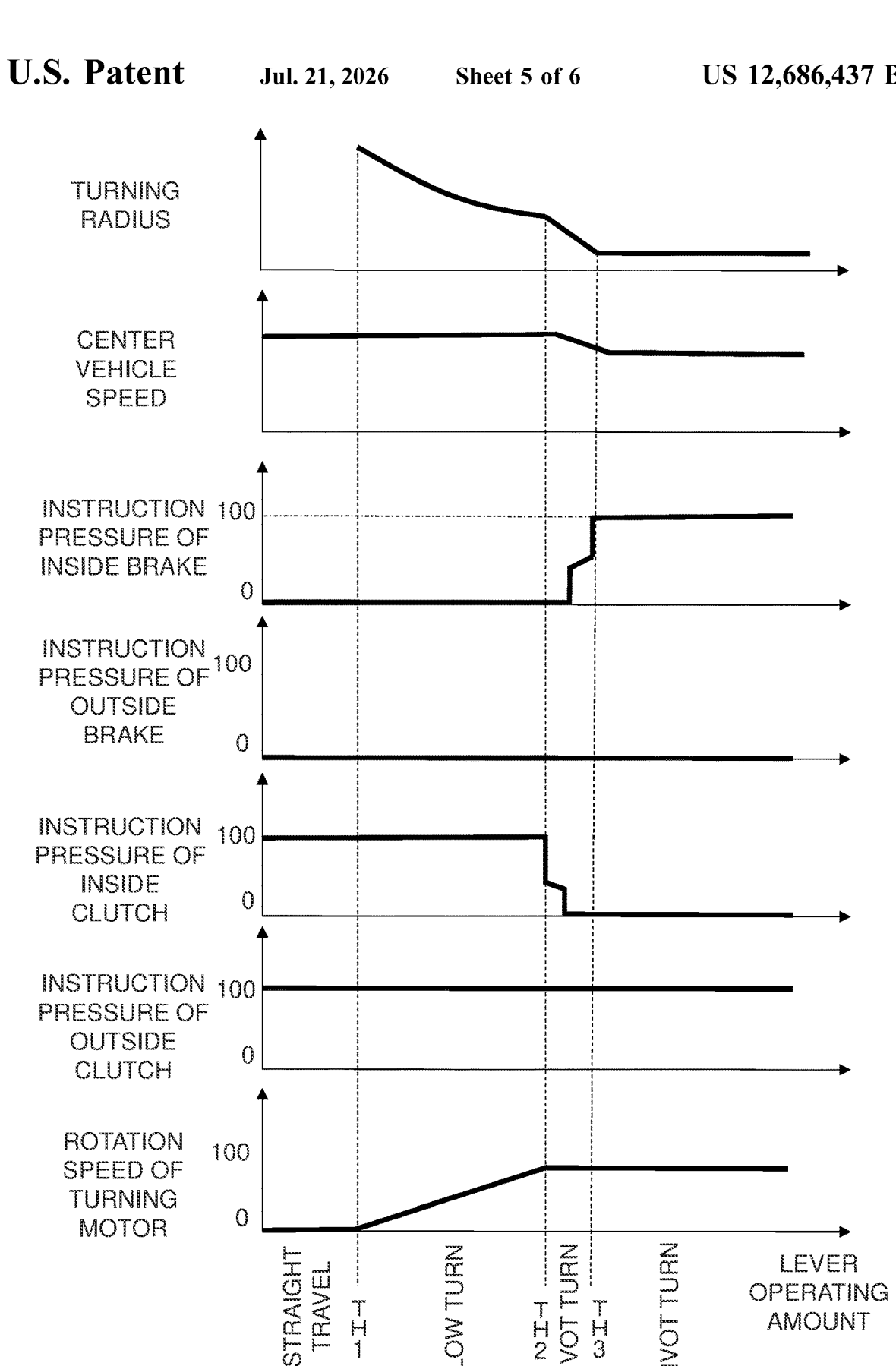
FIG. 5 is graph depicting an example of states of the bulldozer according to the embodiment.

FIG. 4 is a flow chart for explaining the turning control method. FIG. 5 is graph depicting an example of states of the bulldozer 1.

In step S1, the controller 100 causes the bulldozer 1 to travel in the straight travel mode while the operating amount of the steering lever 35 is equal to or less than the first predetermined amount TH1.

Specifically, the controller 100 causes the left and right steering clutches 40L, 40R to engage, causes the left and right steering brakes 50L, 50R to release, and stops the turning motor 80. Consequently, the bulldozer 1 travels straight.

In step S2, when the operating amount of the steering lever is greater than the first predetermined amount TH1 and less than the second predetermined amount TH2, the controller 100 causes the bulldozer 1 to turn in the slow turn mode in the operating direction of the steering lever 35.

Specifically, the controller 100 causes the left and right steering clutches 40L, 40R to engage, causes the left and right steering brakes 50L, 50R to release, and drives the turning motor 80 so that the rotation speed of the inside output shaft $60_{IN}$ becomes lower than the rotation speed of the outside output shaft $60_{OUT}$ as the operating amount of the steering lever 35 increases. Consequently, the bulldozer 1 turns slowly in the operating direction of the steering lever 35.

In the example depicted in FIG. 5, the rotation speed of the turning motor 80 gradually increases from 0% to 100% in proportion to the operating amount of the steering lever 35.

In step S3, when the operating amount of the steering lever is equal to or greater than the second predetermined amount TH2 and less than the third predetermined amount TH3, the controller 100 causes the bulldozer 1 to turn in the semi-pivot turn mode in the operating direction of the steering lever 35.

Specifically, the controller 100 reduces the engagement rate of the inside steering clutch $40_{IN}$, brakes the inside steering brake $50_{IN}$, and drives the turning motor 80 so that the rotation speed of the inside output shaft $60_{IN}$ is lower than the rotation speed of the outside output shaft $600u\text{-}r$. Consequently, the bulldozer 1 performs a semi-pivot turn in the operating direction of the steering lever 35.

In the example depicted in FIG. 5, the engagement rate of the inside steering clutch $40_{IN}$ is reduced by two stages from 100% to 0% in response to the operating amount of the steering lever 35, and the braking force of the inside steering brake $50_{IN}$ is increased in two stages from 0% to 100% in response to the operating amount of the steering lever 35.

In step S4, when the operating amount of the steering lever is equal to or greater than the third predetermined amount TH3, the controller 100 causes the bulldozer 1 to turn in the pivot turn mode in the operating direction of the steering lever 35.

Specifically, the controller 100 maintains the respective engagement rates of the inside steering clutch $40_{IN}$ and the outside steering clutch $40_{OUT}$ at the same degree as the engagement rates in the semi-pivot turn mode, causes the inside steering brake $50_{IN}$ to be completely engaged, and causes the outside steering brake $50_{OUT}$ to release. Further, the controller 100 maintains the rotation speed of the turning motor 80 at about the same rotation speed as in the semi-pivot turn mode. Consequently, the bulldozer 1 performs a pivot turn in the operating direction of the steering lever 35.

When the operating amount of the steering lever 35 is greater than the first predetermined amount TH1 and less than the second predetermined amount TH2, the controller 100 causes the left and right steering clutches 40L, 40R to engage, causes the left and right steering brakes 50L, 50R to release, and drives the turning motor 80 so that the rotation speed of the inside output shaft $60_{IN}$ becomes lower than the rotation speed of the outside output shaft $60_{OUT}$ as the operating amount of the steering lever 35 increases. Consequently, the bulldozer 1 turns slowly toward the operating direction of the steering lever 35.

The controller 100 reduces the engagement rate of the inside steering clutch $40_{IN}$ and causes the inside steering brake $50_{IN}$ to brake when the operating amount of the steering lever 35 is equal to or greater than the second predetermined amount TH2. Consequently, the bulldozer 1 turns quickly (pivot turn or semi-pivot turn) in the operating direction of the steering lever 35.

In this way, both slow turn and quick turn can be performed by controlling the left and right steering clutches 40L, 40R, the left and right steering brakes 50L, 50R, and the turning motor 80.

During a slow turn, the left and right steering brakes 50L, 50R are released whereby power loss of the engine 10 can be suppressed in comparison to when the braking force of the left and right steering brakes 50L, 50R is used and the slow turn is performed. In addition, the left and right steering brakes 50L, 50R are not used in the slow turn and therefore the lifetime of the left and right steering brakes 50L, 50R can be increased.

The controller 100 preferably sets the rotation speed of the turning motor 80 to 100% (maximum value) when the operating amount of the steering lever 35 is equal to or greater than the second predetermined amount TH2. Consequently, a reduction in the center vehicle speed of the bulldozer 1 during quick turning can be further suppressed.

The controller 100 preferably increases the braking force of the inside steering brake $50_{IN}$ as the operating amount of the steering lever increases when the operating amount of the steering lever 35 is equal to or greater than the second predetermined amount TH2 and less than the third predetermined amount TH3. Consequently, the control characteristics of the bulldozer 1 can be improved while switching from the slow turn to the pivot turn because the semi-pivot turn is interposed between the slow turn and the pivot turn.

The controller 100 preferably sets the braking force of the inside steering brake $50_{IN}$ to 100% (maximum value) when the operating amount of the steering lever 35 is the third predetermined amount TH3. Consequently, the adjustment range of the turning radius during the semi-pivot turn can be increased.

The controller 100 preferably sets the engagement rate of the inside steering clutch $40_{IN}$ to 0% when the operating amount of the steering lever 35 is equal to or greater than the second predetermined amount TH2. Consequently, the turning radius during the quick turn (especially the semi-pivot turn) can be reduced.

The controller 100 drives the turning motor 80 during a quick turn whereby the turning radius of the bulldozer 1 during the quick turn can be reduced.

MODIFIED EXAMPLES OF THE EMBODIMENT

The present disclosure is not limited to the above embodiment and various changes and modifications may be made without departing from the spirit of the disclosure.

Modified Example 1

While the controller 100 in the above embodiment increases the braking force of the inside steering brake $50_{IN}$ as the operating amount of the steering lever 35 increases in the semi-pivot turn mode, the braking force of the inside steering brake $50_{IN}$ may be maintained at a predetermined amount greater than 0%.

Modified Example 2

While the controller 100 in the above embodiment interposes the semi-pivot turn mode between the slow turn mode and the pivot turn mode, the slow turn mode and the pivot turn mode may be performed consecutively without the semi-pivot turn mode being interposed therebetween. In this case, the quick turn signifies only the pivot turn.

Modified Example 3

While the controller 100 in the above embodiment switches from the slow turn mode to the quick turn mode (semi-pivot turn mode and pivot turn mode) in response to the operating amount of the steering lever 35, the present invention is not limited in this way. The controller 100 may switch from the slow turn mode to the quick turn mode in response to the operating amount of the steering lever 35 being greater than the first predetermined amount TH1 and in response to the reception of a quick turn instruction from the operator.

Figure 6:
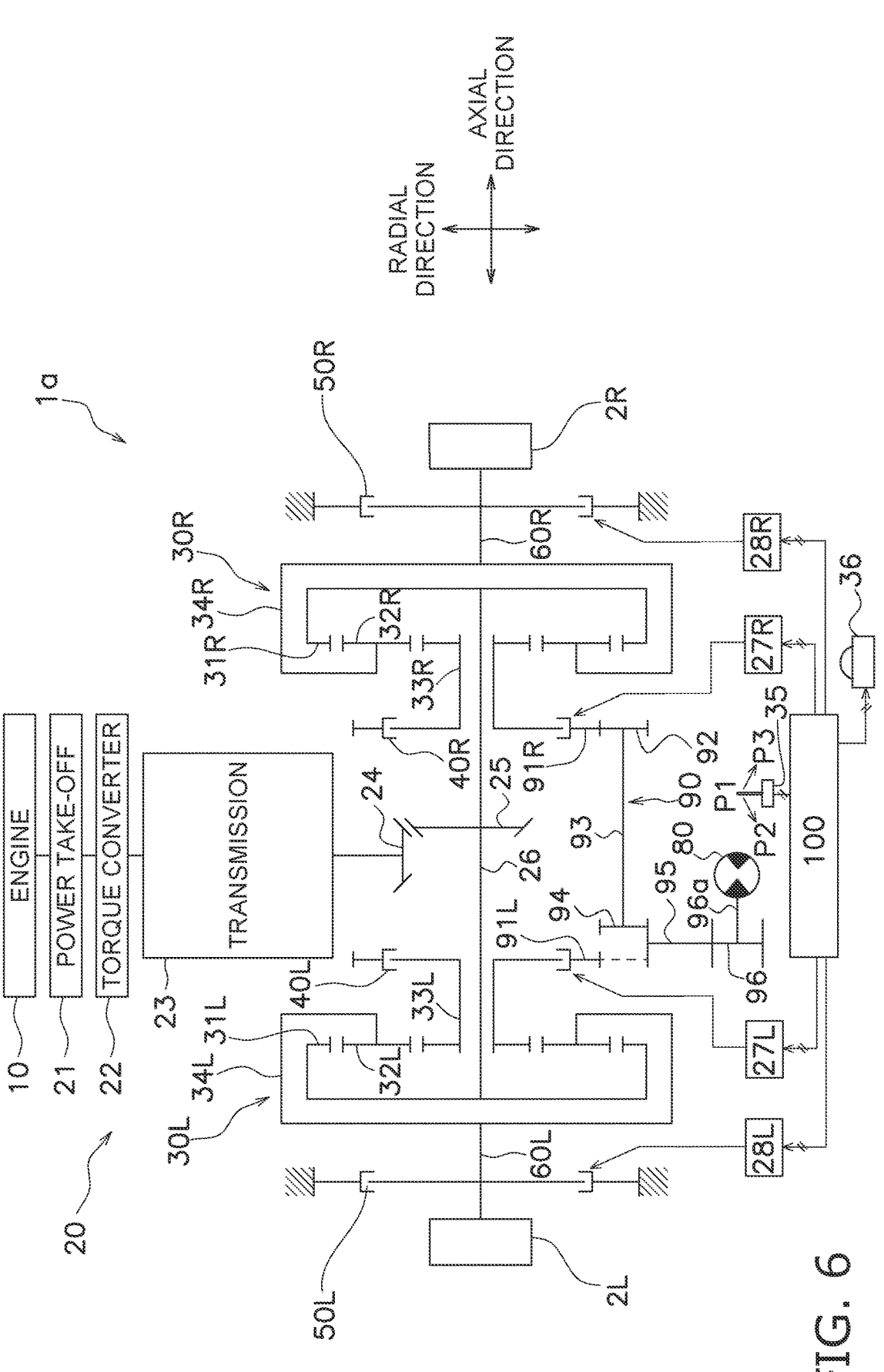
FIG. 6 is an outline system configuration view of the power transmission system of the bulldozer according to a third modified example.

FIG. 6 is an outline system configuration diagram of the power transmission system of a bulldozer 1a according to the present modified example. The bulldozer 1a is provided with the same configuration as the bulldozer 1 according to the above embodiment except that a quick turn button 36 is further provided.

The quick turn button 36 is connected to the controller 100. The quick turn button 36 receives a quick turn instruction from the operator. When the quick turn button 36 is pressed by the operator, the quick turn instruction is transmitted to the controller 100. The quick turn instruction may be transmitted to the controller 100 while the quick turn button 36 is being pressed by the operator, or the quick turn instruction may be continuously transmitted to the controller 100 until the quick turn button 36 is pressed again by the operator.

The controller 100 sets the travel mode of the bulldozer 1 to the straight travel mode as explained in the above embodiment when the operating amount of the steering lever 35 is equal to or less than the first predetermined amount TH1.

The controller 100 sets the travel mode of the bulldozer 1 to the slow turn mode when the operating amount of the steering lever 35 is greater than the first predetermined amount TH1 and no quick turn instruction has been received. The control by the controller 100 in the slow turn mode is as explained in the above embodiment.

However, while the quick turn mode is set when the operating amount of the steering lever 35 is equal to or greater than the second predetermined amount TH2 in the above embodiment, the mode does not become the quick turn mode even when the operating amount of the steering lever 35 is equal to or greater than the second predetermined amount TH2 in the present modified example. Accordingly, the steering lever 35 is used only for causing the bulldozer 1 to perform the slow turn in the present modified example.

The controller 100 sets the travel mode of the bulldozer 1 to the quick turn mode when the operating amount of the steering lever 35 is greater than the first predetermined amount TH1 and the quick turn instruction has been received. The control by the controller 100 in the quick turn mode is as explained in the above embodiment.

While the mode is switched from the semi-pivot turn mode to the pivot turn mode in response to the operating amount of the steering lever 35 in the above embodiment, the controller 100 in the present modified example sets the mode to the semi-pivot turn mode over a predetermined time period after the reception of the quick turn instruction and switches to the pivot turn after the predetermined time period has elapsed. However, the controller 100 in the present modified example may perform the slow turn mode and the pivot turn mode consecutively without the semi-pivot turn mode being interposed therebetween.

Modified Example 4

While the left and right steering clutches 40L, 40R are positive-type hydraulic clutches in the above embodiment, the left and right steering clutches 40L, 40R may also be negative-type hydraulic clutches.

Modified Example 5

While the left and right steering brakes 50L, 50R are negative-type hydraulic brakes in the above embodiment, the left and right steering brakes 50L, 50R may also be positive-type hydraulic brakes.

Modified Example 6

While the left and right output shafts 60L, 60R are respectively coupled to the left and right sprockets 2L, 2R in the above embodiment, left and right final drive gears may be respectively interposed between the left and right output shafts 60L, 60R and the left and right sprockets 2L, 2R.

Modified Example 7

While the controller 100 in the above embodiment drives the turning motor 80 in the quick turn mode (semi-pivot turn mode and pivot turn mode), the present invention is not limited in this way. The controller 100 may not drive the turning motor 80 in the semi-pivot turn mode or may not drive the turning motor 80 in the pivot turn mode.

The invention claimed is:

1. A crawler-type work machine comprising:
left and right planetary gear mechanisms disposed between an input shaft and left and right output shafts;
left and right steering clutches configured to be able to rotate about the input shaft and switch between transmitting and blocking rotational power from the input shaft to the left and right output shafts by means of the left and right planetary gear mechanisms;
left and right steering brakes configured to brake the left and right output shafts;
a turning motor configured to cause the left and right steering clutches to rotate so that a rotation speed difference is produced between the left and right output shafts;
a steering lever configured to be operated in a left turning direction and a right turning direction using a neutral position as a point of reference; and
a controller configured to control the left and right steering clutches, the left and right steering brakes, and the turning motor in response to an operating direction and an operating amount of the steering lever,
the controller being further configured to
cause the left and right steering clutches to engage, cause the left and right steering brakes to release, and drive the turning motor so that, among the left and right output shafts, a rotation speed of an inside output shaft corresponding to the operating direction becomes lower than a rotation speed of an outside output shaft opposite to the operating direction as the operating amount increases when the operating amount is greater than a first predetermined amount and less than a second predetermined amount; and
reduce an engagement rate of an inside steering clutch corresponding to the operating direction among the left and right steering clutches and cause an inside steering brake corresponding to the operating direction among the left and right steering brakes to brake while continuously driving the turning motor, when the operating amount is equal to or greater than the second predetermined amount.

2. The crawler-type work machine according to claim 1, wherein
the controller is configured to set a rotation speed of the turning motor to a maximum value when the operating amount is equal to or greater than the second predetermined amount.

3. The crawler-type work machine according to claim 2, wherein
the controller is configured to increase a braking force of the inside steering brake as the operating amount increases when the operating amount is equal to or greater than the second predetermined amount and less than a third predetermined amount.

4. The crawler-type work machine according to any one of claim 3, wherein
the controller is configured to set the braking force of the inside steering brake to a maximum value when the operating amount is the third predetermined amount.

5. The crawler-type work machine according to claim 4, wherein
the controller is configured to set the engagement rate of the inside steering clutch to 0% when the operating amount is equal to or greater than the second predetermined amount.

6. The crawler-type work machine according to claim 1, wherein
the controller is configured to increase a braking force of the inside steering brake as the operating amount increases when the operating amount is equal to or greater than the second predetermined amount and less than a third predetermined amount.

7. The crawler-type work machine according to any one of claim 6, wherein
the controller is configured to set the braking force of the inside steering brake to a maximum value when the operating amount is the third predetermined amount.

8. The crawler-type work machine according to claim 1, wherein
the controller is configured to set the engagement rate of the inside steering clutch to 0% when the operating amount is equal to or greater than the second predetermined amount.

9. The crawler-type work machine according to claim 1, wherein
each of the left and right planetary gear mechanisms includes a ring gear coupled to the input shaft, a sun gear rotatably attached to the input shaft and coupled to the steering clutch, a planetary gear disposed between the ring gear and the sun gear, and a carrier coupled to the planetary gear and the output shaft.

10. The crawler-type work machine according to claim 9, further comprising left and right clutch gears configured to be able to connect and disconnect with the sun gear of the respective left and right planetary gear mechanisms through the left and right steering clutches, and be able to rotate in opposite directions, and an idler gear configured to transmit rotational power of the turning motor to the left and right clutch gears.

11. A crawler-type work machine comprising:

left and right planetary gear mechanisms disposed between an input shaft and left and right output shafts;

left and right steering clutches configured to be able to rotate about the input shaft and switch between transmitting and blocking rotational power from the input shaft to the left and right output shafts by means of the left and right planetary gear mechanisms;

left and right steering brakes configured to respectively brake the left and right output shafts;

a turning motor configured to cause the left and right steering clutches to rotate so that a rotation speed difference is produced between the left and right output shafts;

a steering lever configured to be operated in a left turning direction and a right turning direction using a neutral position as a point of reference; and a controller configured to control the left and right steering clutches, the left and right steering brakes, and the turning motor in response to an operating direction and an operating amount of the steering lever, the controller being further configured to cause the left and right steering clutches to engage, cause the left and right steering brakes to release, and drive the turning motor so that, among the left and right output shafts, the rotation speed of an inside output shaft corresponding to the operating direction becomes lower than the rotation speed of an outside output shaft opposite to the operating direction as the operating amount increases when the operating amount is greater than a first predetermined amount and a quick turn instruction has not been received from an operator; and reduce an engagement rate of the inside steering clutch corresponding to the operating direction among the left and right steering clutches and cause the inside steering brake corresponding to the operating direction among the left and right steering brakes to brake while continuously driving the turning motor, when the operating amount is greater than the first predetermined amount and the quick turn instruction has been received.

12. The crawler-type work machine according to claim 11, wherein the controller is configured to set a rotation speed of the turning motor to a maximum value when the operating amount is equal to or greater than the second predetermined amount and the quick turn instruction has been received.

13. The crawler-type work machine according to claim 12, wherein the controller is configured to set the braking force of the inside steering brake to a maximum value when the operating amount is greater than the first predetermined amount and the quick turn instruction has been received.

14. The crawler-type work machine according to claim 13, wherein the controller is configured to set the engagement rate of the inside steering clutch to 0% when the operating amount is greater than the first predetermined amount and the quick turn instruction has been received.

15. The crawler-type work machine according to claim 14, further comprising a quick turn button configured to receive the quick turn instruction from an operator.

16. The crawler-type work machine according to claim 11, wherein the controller is configured to set the braking force of the inside steering brake to a maximum value when the operating amount is greater than the first predetermined amount and the quick turn instruction has been received.

17. The crawler-type work machine according to claim 11, wherein the controller is configured to set the engagement rate of the inside steering clutch to 0% when the operating amount is greater than the first predetermined amount and the quick turn instruction has been received.

18. The crawler-type work machine according to claim 11, further comprising a quick turn button configured to receive the quick turn instruction from an operator.

* * * * *